July 21, 1964 T. W. GLYNN ETAL 3,141,592
APPARATUS FOR BREAKING SHEET GLASS ALONG PARALLEL LINES
Filed Jan. 3, 1961 4 Sheets-Sheet 4
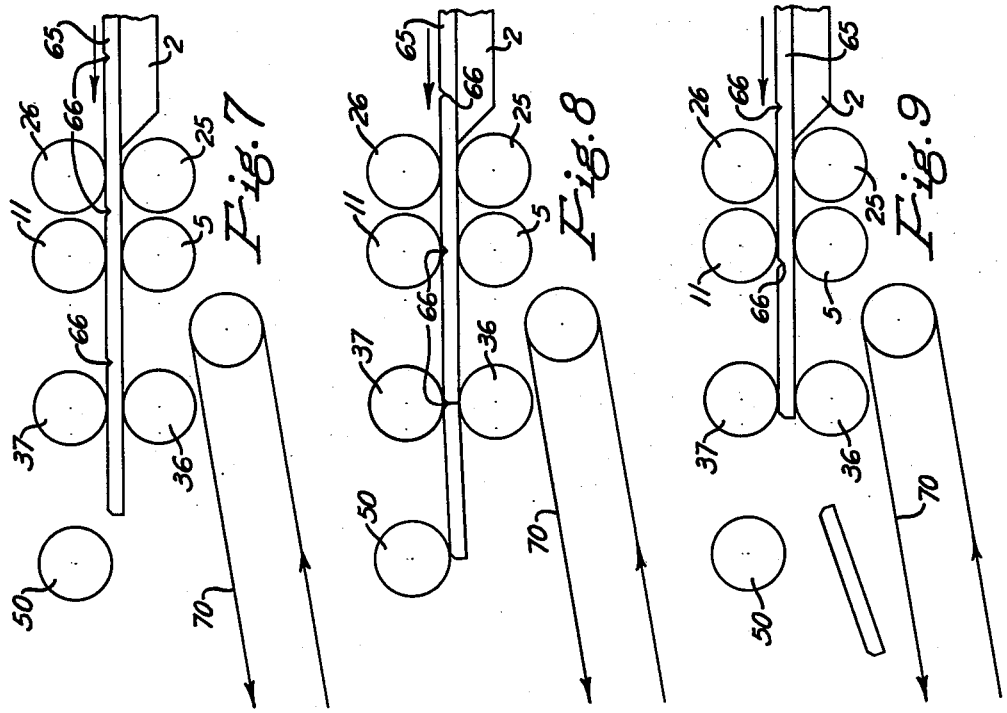
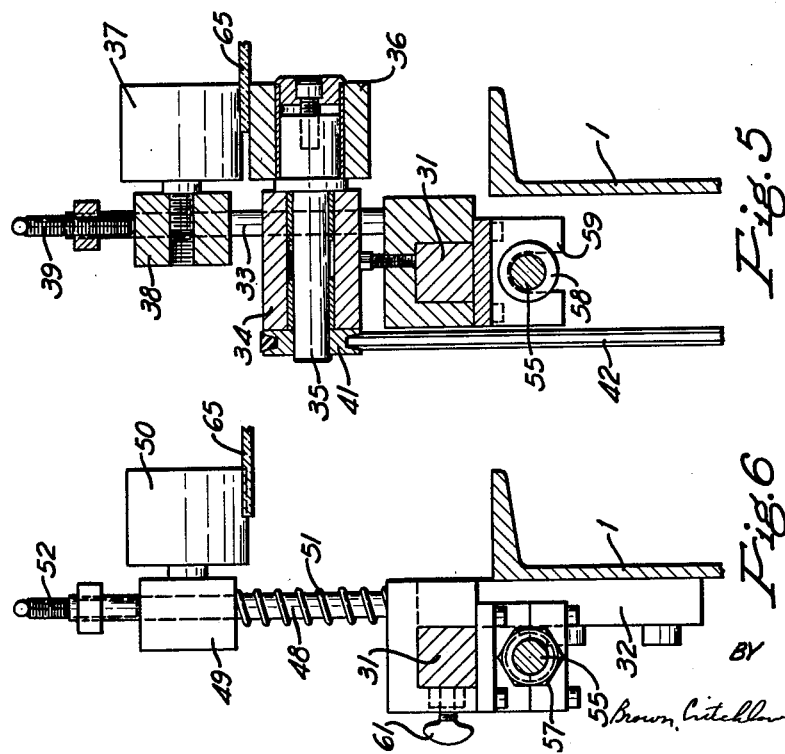
INVENTORS
THEODORE W. GLYNN
CARL C. SWANN
BY
ATTORNEYS 000# United States Patent Office 3,141,592
Patented July 21, 1964

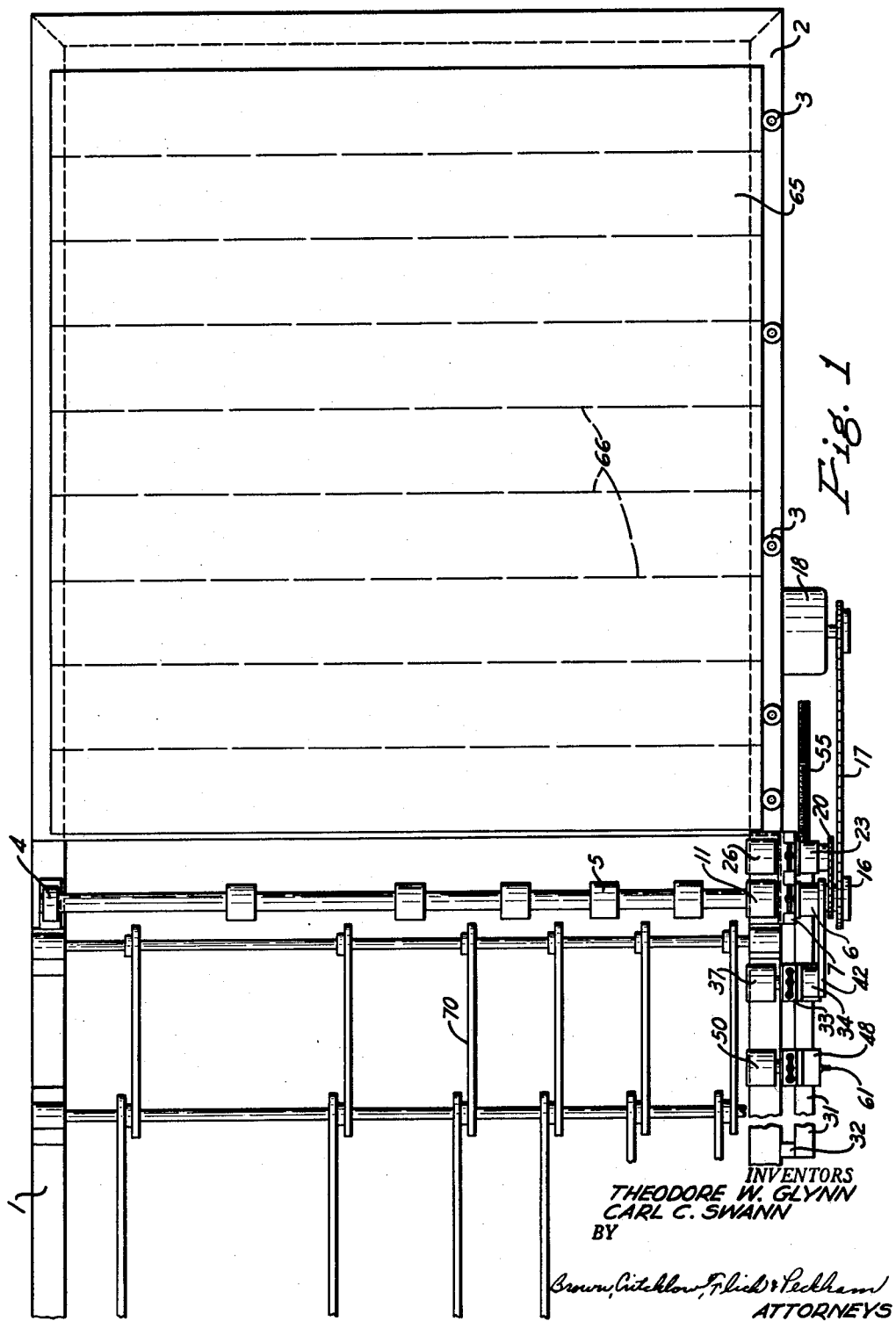

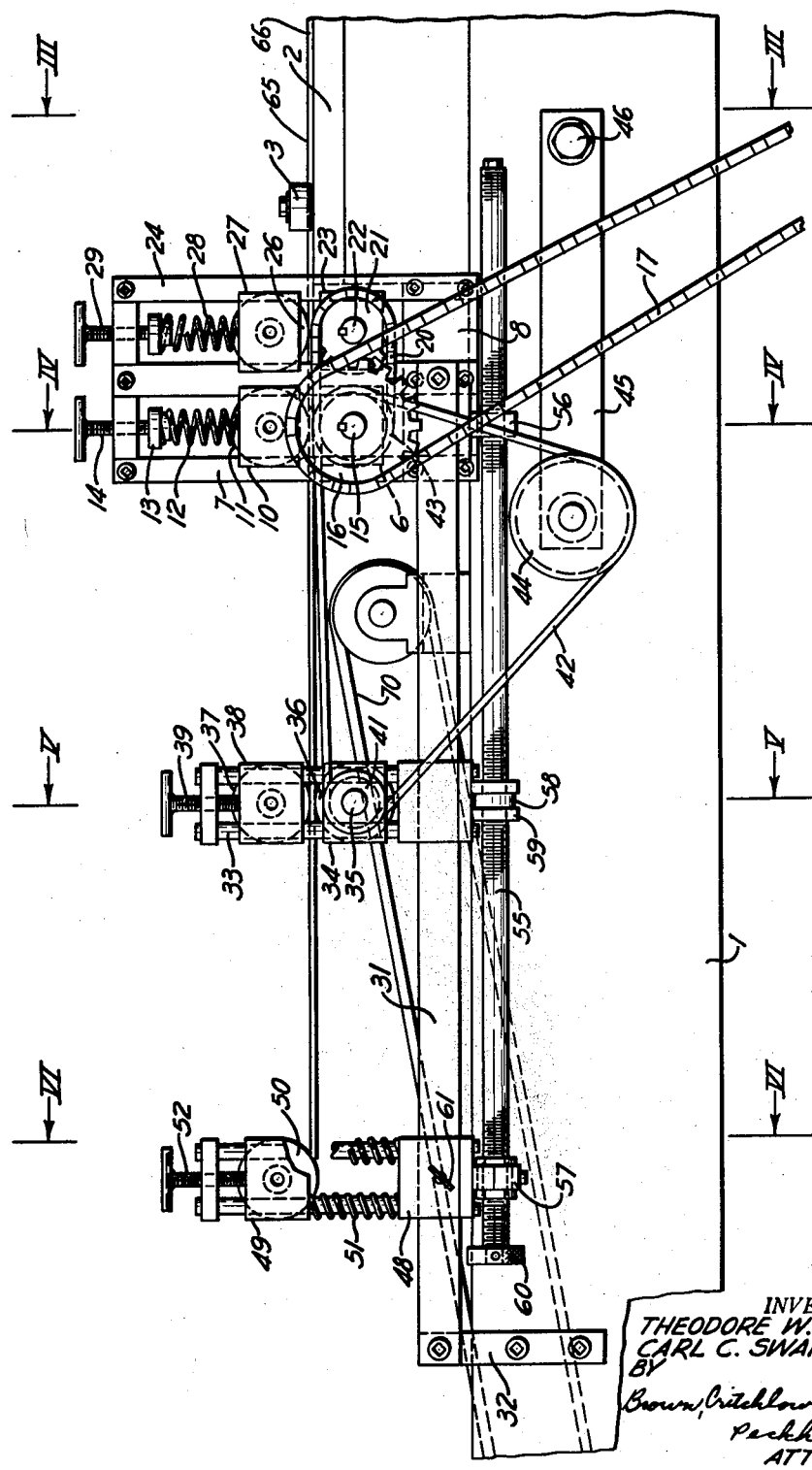

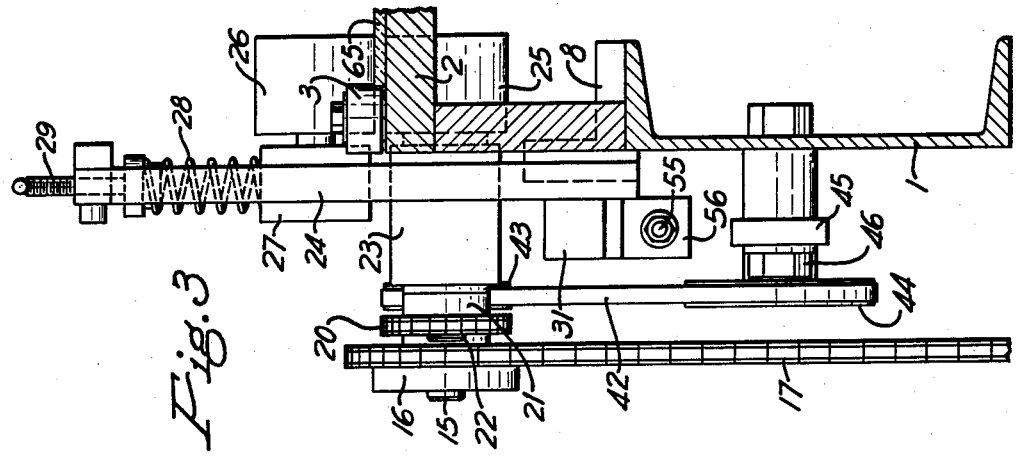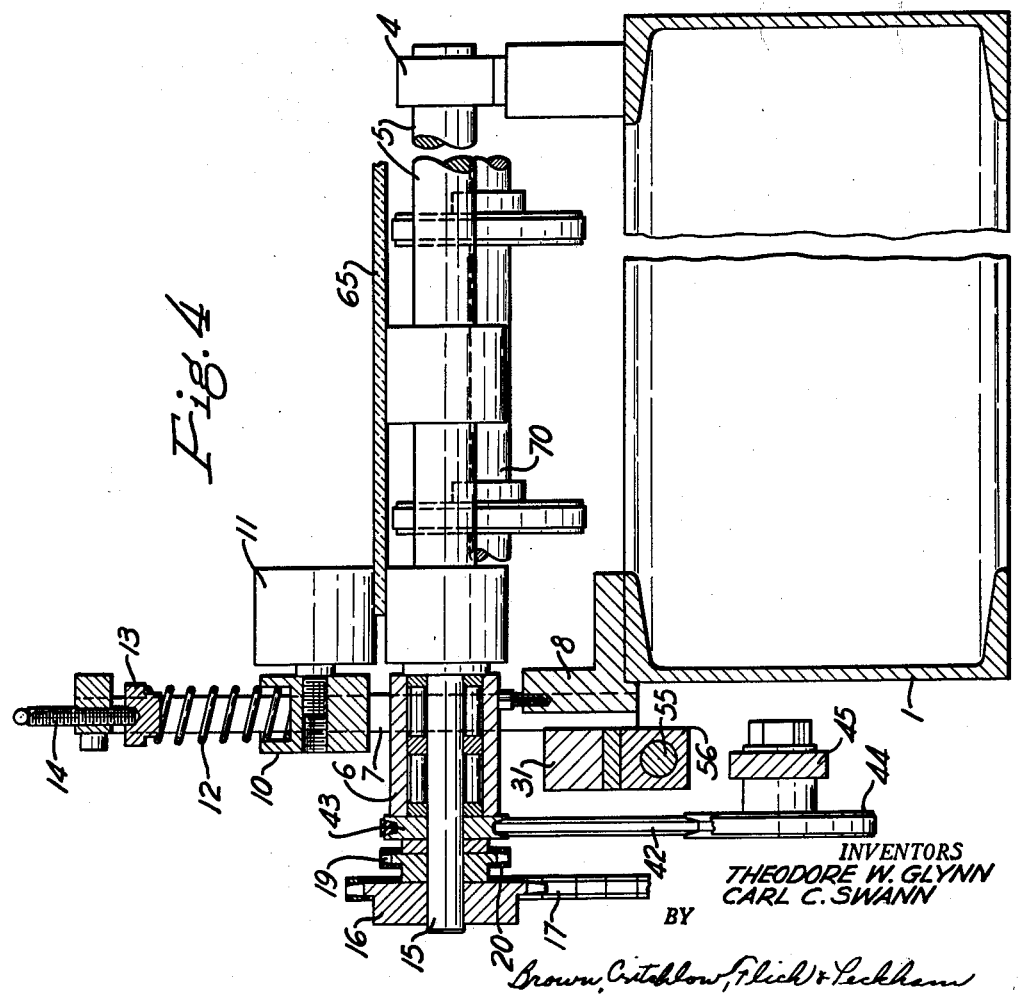

3,141,592
APPARATUS FOR BREAKING SHEET GLASS
ALONG PARALLEL LINES
Theodore W. Glynn and Carl C. Swann, Kingsport, Tenn., assignors to American-Saint Gobain Corporation, New York, N.Y., a corporation of Delaware
Filed Jan. 3, 1961, Ser. No. 80,427
7 Claims. (Cl. 225—98)

This invention relates to apparatus for separating glass sheets into shorter lengths, and more particularly to the breaking of glass sheets along parallel score lines to form narrow strips.

In many places, such as jalousie windows and doors, narrow strips of glass are used. Such strips or lights generally are from about 4 to 6 inches wide and 20 to 40 inches long. The problem is to cut them from a sheet of glass fast enough to be commercial. That requires a machine. One system that has been proposed is to score the sheet transversely and then break strips from it along the score lines as the sheet is run forward over the end of a table or between rollers that extend across the sheet. Such a method has the objection that the glass does not consistently break perpendicularly to its upper and lower surfaces and is not free from chips along the break.

It is among the objects of this invention to provide apparatus for separating traveling sheet glass into shorter lengths along parallel transverse score lines, which makes clean breaks, which breaks the glass in planes perpendicular to its upper and lower surfaces, and which has a high rate of production.

In accordance with this invention, feed rolls are provided for engaging the upper and lower surfaces of a glass sheet that has been provided with parallel uniformly spaced transverse score lines. In front of the feed rolls there is a pair of breaker rolls for engaging the same surfaces of the sheet at only one edge of the sheet. The distance between vertical axial planes through the breaker rolls and adjacent feed rolls is equal to the distance between the score lines of the glass sheet. In front of the breaker rolls there is a pressure roll for engaging the upper surface of the sheet at the same edge as the breaker rolls. The breaker rolls are located half-way between the feed rolls and pressure roll. The bottom of the pressure roll is disposed slightly below the plane of the sheet in order to deflect downward the front corner of the sheet that strikes the pressure roll. This causes the sheet to break along the score line between the breaker rolls.

The preferred embodiment of the invention is illustrated in the accompanying drawings, in which FIG. 1 is a plan view of my apparatus;

FIG. 2 is an enlarged fragmentary side view of the apparatus in the region of the rolls;

FIGS. 3, 4, 5 and 6 are enlarged vertical sections taken on the lines III—III, IV—IV, V—V and VI—VI, respectively, and ;

FIGS. 7, 8, and 9 are diagrammatic side views showing a glass sheet being fed forward and a strip broken from its front end.

Referring to FIGS. 1 to 4 of the drawings, a table frame 1 has a flat top 2 at one end. A row of longitudinally spaced guide rollers 3, turning on vertical axes, extends along one side of the table top. A few inches in front of the flat top, one side of the frame supports a bearing 4, in which is journaled one end of a feed roll 5 that extends across the frame and into a bearing 6 at the opposite side. Bearing 6 extends through a roll housing 7 attached at its lower end to a bracket 8 secured to the table frame. Slidable vertically in the same housing is a block 10, by which an upper roll 11 is supported. Upward movement of the block in the housing is resisted by a coil spring 12 that carries a cap 13 engaged by the lower end of an adjusting screw 14 threaded in the upper end of the housing.

The shaft 15 of the lower feed roll extends out through bearing 6 and has a sprocket 16 on its outer end. This sprocket is driven by a chain 17 from an electric motor 18 (FIG. 1) disposed in any suitable location. Also mounted on the shaft is a smaller sprocket 19 that is connected by a chain 20 to a sprocket 21 on the outer end of a shaft 22 behind bearing 6. The shaft is rotatably mounted in a bearing 23 that is mounted in a rear feed roll housing 24. The inner end of the shaft carries a very short roll 25, above which there is another roll 26 of the same size supported by a block 27 that is slidable vertically in the housing. Upward movement of the block is resisted by a coil spring 28 and screw 29 threaded in the top of the housing. Consequently, the motor, through the two sprockets, drives both of the lower feed rolls. The rear pair of the feed rolls 25 and 26 is not absolutely necessary, but is desirable for smoother feeding and less wear of the rolls.

Secured to the lower part of at least the front feed roll housing 7 is the rear end of a horizontal bar 31 that extends forward several feet along the table frame and is supported at its front end by a bracket 32 connected to the frame. Slidably mounted on the bar is a breaker roll housing 33, in which a bearing 34 is mounted. A shaft 35 is rotatably mounted in the bearing and carries a short breaker roll 36 at its inner end. Above this roll is a similar roll 37 rotatably mounted on a shaft secured to a block 38 that is slidable vertically on the housing beneath an adjusting screw 39. The outer end of the lower shaft 35 carries a pulley 41 that is driven by a belt 42 from another pulley 43 on feed roll shaft 15. Pulley 41 is a little smaller than the other pulley so that roll 36 can be driven faster than roll 5. For a purpose about to be described, the belt supports an idler pulley 44 journaled in the front end of an arm 45, the rear end of which is pivotally connected to the table frame by a bolt 46.

Also slidably mounted on bar 31 is the lower end of a pressure roll housing 48, on which a block 49 is slidably mounted for supporting a short pressure roll 50. The block is supported by coil springs 51 encircling the sides of the housing, and its upward movement is limited by a hand screw 52 threaded in the upper end of the housing.

For the purpose of this invention, the three front housings always are spaced equal distances apart, but are adjustable toward and away from each other. This is accomplished by means of a horizontal screw 55 having right-hand threads at one end and left-hand threads at the other end. The rear end of the screw is supported in a nut 56 secured to the bottom of bar 31 beside the front feed roll housing 7. The front end of the screw is supported in a nut 57 connected to the bottom of the pressure roll housing 48. The central portion of the screw is encircled by a rigid collar 58 that is disposed between a pair of forked members 59 which straddle the screw and are secured to the bottom of breaker roll housing 33. When the screw is turned by a knob 60 on its front end in a direction to move the screw back through rear nut 56, the front housing 48 will move in the same direction on the screw at the same time and, therefore, the distances between the three housings will remain uniform. Slack in the belt 42 is taken up by idler pulley 44, which swings down under its own weight. The housings can be locked in the desired position on bar 31 by simply tightening against it a thumb screw 61 threaded in pressure roll housing 48.

To use this apparatus a rolled sheet of glass 65, which previously has been scored along parallel transverse lines 66 any desired distance apart, is placed on table 2 with one edge against guide rollers 3. If the score lines are close together as shown, jealousie lights can be produced. The sheet then is pushed forward until a front corner is caught between feed rolls 25 and 26, by which it is moved forward into engagement with feed rolls 5 and 11. The two sets of feed rolls drive the sheet forward into the bite of breaker rolls 36 and 37, which then help to carry it ahead. As shown in FIGS. 2 and 7, the pressure roll 50 is located slightly below the upper surface of the glass sheet, so that the front corner of the sheet will strike the roll and be deflected downward by it. The height of the pressure roll is such that when the front edge of the sheet reaches the lowest point on that roll, the sheet will crack at the adjacent end of the front score line 66 as shown in FIG. 8, and the break will run across the sheet.

An important feature of this invention is that before the sheet is fed into the feed rolls, the breaker rolls and pressure roll are adjusted so that the distance between their vertical axial planes will be the same as the distance between the score lines of the sheet. Because of the action of adjusting screw 55, which has been described, the breaker rolls will always remain midway between the pressure roll and the front feed rolls. This also is very important, as will be explained in the next paragraph. When the rolls have been properly adjusted in this manner, it will follow that the front strip of glass will break away from the rest of the sheet at just about the moment the front score line reaches the center of the breaker roll pass. At that instant, the second score line will be at the center of the pass of the front feed rolls 5 and 11, as shown in FIG. 8. At that location the sheet is supported across its width by lower roll 5 or a suitable equivalent but the portion of the sheet in front of the roll is unsupported except by lower breaker roll 36 at only one edge.

The reason that the rolls should be equally spaced apart the same distance as score lines 66 are just described, is that when a span of glass is loaded as a beam the center of the span is the only place where there is no diagonal tension in the glass sheet. This is because the forces acting on a beam are compression and tension due to bending and shear, and the combination of these forces produces diagonal tension in the beam everywhere except at the center of the span. Since the fracture plane in a sheet of glass tends to be at right angles to the direction of the strain, diagonal tension at the break must be avoided if a square-cut edge is to be obtained. This is accomplished by our invention by supporting the glass sheet at the two foremost score lines at the moment the pressure roll 50 bends the sheet down far enough to break it along the front score line. As the front score line, where the break occurs, is at the center of the span between the front feed rolls and the pressure roll, the plane of the break will be perpendicular to the upper and lower surfaces of the sheet.

The pressure roll 50 being very short, it starts the break or cut at the edge of the sheet between the breaker rolls, and the cut runs across the unsupported portion of the sheet almost instantaneously, because of the torsion transmitted to the overhanging portion of the sheet. If the pressure roll and the breaker rolls extended all the way across the sheet, most of the cut would bevel one way or the other so that the cut edges would not be perpendicular to the surface of the sheet. This is due partially to the fact that sheet glass is not perfectly flat nor uniform in thickness, so that rolls extending across it would not bear uniformly against it throughout its width. Also, if the pressure and breaker rolls extended all the way across the sheet and uniform pressure could be exerted across the sheet, a perpendicular break would not result unless the score line was parallel to the axes of the rolls and centered over the lower breaker roll at the instant the break occurred. The machine is fed by hand, and at high rates of production with the limited time available it is practically impossible to feed every scored sheet so that the score lines will be parallel with the breaker rolls. Unequal wear of the guiding rollers 3 or a sheet not cut square as well as inaccurate positioning of the sheet fed to the machine, will result in score lines not parallel with the rolls. By using short breaker and pressure rolls, however, a square break can be achieved even though the sheet is slightly skewed in the machine.

To prevent chipping of the lower edges of the cut, it is opened up immediately after the break occurs. This is accomplished because the lower breaker roll 36 is driven faster than the feed rolls and therefore kicks the severed glass strip forward away from the rest of the sheet as shown in FIG. 9. It also tends to skew the strip slightly, which likewise spreads the cut. The glass strip drops onto a conveyor 70 and is carried away to a stacker or another point.

Due to the fact that engagement of a corner of the sheet with the pressure roll 50 tends to stop the sheet at that corner, which could cause the sheet to skew on the table if driven from both edges or across its width, the sheet is driven only from the edge that engages guide rollers 3. That is one reason for using short feed rolls. It is true that lower roll 5 is shown extending across the sheet, thereby not only supporting it but also helping to propel it through the machine, but the sheet is pressed against roll 5 by upper roll 11 only at the edge. The exact length of the various short rolls is not critical, but they should not extend across the sheet any further than necessary. This is especially true of the pressure roll. It has been found that rolls two inches long which overlap the sheet for only about an inch are quite satisfactory.

We claim:

1. Apparatus for breaking traveling sheet glass along parallel uniformly spaced transverse score lines, comprising feed rolls for engaging the upper and lower surfaces of such a glass sheet to feed it forward in a flat plane, a pair of vertically aligned breaker rolls in front of the feed rolls for engaging said surfaces at only one edge of the sheet, the distance between vertical axial planes through said feed rolls and breaker rolls being equal to the distance between the score lines of the glass sheet, and a pressure roll in front of the breaker rolls for engaging the upper surface of the sheet at only said one edge, the vertically aligned breaker rolls being located halfway between said feed rolls and pressure roll, and the bottom of the pressure roll being disposed slightly below said plane to deflect downward the front corner of the sheet striking the pressure roll to cause the sheet to break first along the score line at said edge between the breaker rolls, the breaker rolls extending across the sheet only far enough to cause said break to start at said one edge and then run across the sheet.

2. Apparatus according to claim 1, in which the upper feed roll is engageable with the glass sheet only at said one edge, and the lower feed roll is engageable with the sheet across its width.

3. Apparatus according to claim 1, in which said pressure roll is short enough to extend across the sheet a distance less than about two inches.

4. Apparatus according to claim 1, in which said breaker rolls and pressure roll are substantially the same length and will extend across the sheet less than about two inches.

5. Apparatus for breaking traveling sheet glass along parallel uniformly spaced transverse score lines, comprising feed rolls for engaging the upper and lower surfaces of such a glass sheet to feed it forward in a flat plane, means for driving a feed roll, a pair of breaker rolls in front of the feed rolls for engaging said surfaces at only one edge of the sheet, a pulley on the driven feed roll, a smaller pulley on one of the breaker rolls, a belt around said pulleys for driving said one breaker roll faster than the feed roll driving it, the distance between vertical axial planes through said feed rolls and breaker rolls being equal to the distance between the score lines of the glass sheet, and a pressure roll in front of the breaker rolls for engaging the upper surface of the sheet at only said one edge, the breaker rolls being located half-way between said feed rolls and pressure roll, and the bottom of the pressure roll being disposed slightly below said plane to deflect downward the front corner of the sheet striking the pressure roll to cause the sheet to break first along the score line at said edge between the breaker rolls.

6. Apparatus for breaking traveling a glass sheet along parallel uniformly spaced transverse score lines, comprising a table for supporting such a glass sheet in a predetermined plane, a pair of feed rolls for engaging the upper and lower surfaces of the sheet to feed it forward, said rolls being disposed in front of the table with the lower roll extending across the table, the upper roll being short enough to extend only a very short distance along the lower roll from one end, vertical guide rollers mounted along the side of the table behind the said upper roll for engagement by one edge of the sheet, a pair of breaker rolls in front of said upper feed roll for engaging said sheet surfaces at only said edge of the sheet, means for driving the lower feed and breaker rolls, the distance between vertical axial planes through said feed rolls and breaker rolls being equal to the distance between the score lines of the glass sheet, and a pressure roll in front of the breaker rolls for engaging the upper surface of the sheet at only said edge, the breaker rolls being located half-way between said feed rolls and pressure roll, and the bottom of the pressure roll being disposed slightly below the plane of the top of said table to deflect downward the front corner of the sheet striking the pressure roll to cause the sheet to break first along the score line at said edge between the breaker rolls.

7. Apparatus for breaking traveling sheet glass along parallel uniformly spaced transverse score lines, comprising feed rolls for engaging the upper and lower surfaces of such a glass sheet to feed it forward in a flat plane, a pair of vertically aligned breaker rolls in front of the feed rolls for engaging said surfaces at only one edge of the sheet, the distance between vertical axial planes through said feed rolls and breaker rolls being equal to the distance between the score lines of the glass sheet, a pressure roll in front of the breaker rolls for engaging the upper surface of the sheet at only said one edge, the vertically aligned breaker rolls being located half-way between said feed rolls and pressure roll, and the bottom of the pressure roll being disposed slightly below said plane to deflect downward the front corner of the sheet striking the pressure roll to cause the sheet to break along the score line between the breaker rolls, the breaker rolls extending across the sheet only far enough to cause said break to start at said one edge and then run across the sheet, a support extending lengthwise of the path of travel of the glass sheet, housings for the breaker rolls and pressure roll slidably mounted on said support, a manually rotatable screw having right-hand threads at one end and left-hand threads at the opposite end, a fixed nut adjacent the feed roll housing for one end of the screw, the opposite end of the screw having a threaded connection with the pressure roll housing, and means connecting the breaker roll housing to the central portion of the screw for movement therewith lengthwise of said support when the screw is turned.

References Cited in the file of this patent
UNITED STATES PATENTS

| | | |
|---|---|---|
| 2,042,819 | Allison | June 2, 1936 |
| 2,236,011 | Shock | Mar. 25, 1941 |
| 2,252,362 | Carus | Aug. 12, 1941 |
| 2,766,516 | Chantler | Oct. 16, 1956 |
| 2,948,991 | Walters et al. | Aug. 16, 1960 |
| 3,044,216 | Billinger | July 17, 1962 |